(12) United States Patent
Kunze et al.

(10) Patent No.: US 6,879,593 B1
(45) Date of Patent: Apr. 12, 2005

(54) CONNECTIONS OF NODES ON DIFFERENT NETWORKS

(75) Inventors: Aaron R. Kunze, Portland, OR (US); Jim W. Edwards, Portland, OR (US); Christian Dreke, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/468,004

(22) Filed: Dec. 20, 1999

(51) Int. Cl.[7] .......................... H04L 12/28; H04L 12/56
(52) U.S. Cl. ....................... 370/401; 370/402; 370/404
(58) Field of Search ................................ 370/356, 401, 370/402, 403, 404, 405, 229, 230, 235, 236, 395.2, 395.21, 395.42; 379/112.01, 112.06, 133, 134; 709/227, 241

(56) References Cited

U.S. PATENT DOCUMENTS

| | | | | |
|---|---|---|---|---|
| 5,166,931 A | * | 11/1992 | Riddle | 370/401 |
| 5,623,605 A | * | 4/1997 | Keshav et al. | 709/236 |
| 5,745,680 A | * | 4/1998 | Brooks et al. | 709/227 |
| 5,864,683 A | * | 1/1999 | Boebert et al. | 709/249 |
| 5,953,389 A | * | 9/1999 | Pruett et al. | 379/9 |
| 5,999,518 A | * | 12/1999 | Nattkemper et al. | 370/258 |
| 6,049,820 A | * | 4/2000 | Murphy et al. | 709/203 |
| 6,058,431 A | * | 5/2000 | Srisuresh et al. | 709/245 |
| 6,101,543 A | * | 8/2000 | Alden et al. | 709/229 |
| 6,128,298 A | * | 10/2000 | Wootton et al. | 370/392 |
| 6,363,053 B1 | * | 3/2002 | Schuster et al. | 370/230 |
| 6,396,840 B1 | * | 5/2002 | Rose et al. | 370/401 |
| 6,412,006 B2 | * | 6/2002 | Naudus | 709/227 |
| 6,418,139 B1 | * | 7/2002 | Akhtar | 370/356 |
| 6,470,389 B1 | * | 10/2002 | Chung et al. | 709/227 |
| 6,510,509 B1 | * | 1/2003 | Chopra et al. | 712/13 |
| 6,584,110 B1 | * | 6/2003 | Mizuta et al. | 370/401 |
| 6,591,306 B1 | * | 7/2003 | Redlich | 709/245 |
| 6,681,252 B1 | * | 1/2004 | Schuster et al. | 709/227 |
| 6,681,259 B1 | * | 1/2004 | Lemilainen et al. | 709/250 |

OTHER PUBLICATIONS

Ying–Da Lee, "SOCKS: A protocol for TCP proxy across firewalls", NEC Systems Laboratory, http:/143.101.182.11/socks4.protocol, undated.

Leech, et al., "SOCKS Protocol Version 5", Internet Engineering Task Force, RFC1928, http://www.ietf.org/rfc/rfc1928.txt, Mar. 1996.

Lo, et al., "Realm Specific IP: A Framework", Internet Engineering Task Force, Internet Draft, http://www.ietf.org/internet–drafts/draft–ietf–nat–rsip–framework–01.txt, May, 1999.

Srisuresh, et al., "Traditional IP Network Address Translator (Traditional NAT)", Internet Engineering Task Force, Internet Draft, http://search.ietf.org/internet–drafts/draft–ietf–nat–traditional–03.txt., Sep. 1999.

(Continued)

*Primary Examiner*—Wellington Chin
*Assistant Examiner*—Jamal A. Fox
(74) *Attorney, Agent, or Firm*—Fish & Richardson P.C.

(57) ABSTRACT

A connection is established between a node on a first network and at least one node on a second network lacking a valid address on the first network by receiving at a gateway a connection request from the node on the first network, sending information related to the connection request to a plurality of nodes on the second network, receiving responses to the sent information from at least one of the nodes on the second network, and establishing at least one connection between at least one of the nodes on the second network from which responses are received, and the node on the first network, according to the order of the received responses or according to priority weighting information or according to priority weighting information concerning the nodes from which the responses are received.

25 Claims, 3 Drawing Sheets

OTHER PUBLICATIONS

Holdredge et al., "Protocol Complications with the IP Network Address Translator (NAT)", Internet Engineering Task Force, Internet Draft, http://search.ietf.org/internet-drafts/draft-ietf-nat-protocol-complications-01.txt, Jun. 1999.

Borella et al., "Realm Specific IP: Protocol Specification", Internet Engineering Task Force, Internet Draft, http://www.ietf.cnri.reston.va.us/internet-drafts/draft-ietf-nat-rsip-protocol-02.txt, Aug. 1999.

Borella, et al., "Realm Specific IP: Protocol Specification", Inernet Engineering Task Force, Internet Draft, http://www.ietf.cnri.reston.va.us/internet-drafts/draft-ietf-nat-rsip-protocol-04.txt, Oct. 1999.

* cited by examiner

| Public Network Port Number | Private Network Address | Private Network Port Number |
|---|---|---|
|  |  |  |
| 1095 | 10.0.0.3 | 1095 |
| 2743 | 10.0.0.4 | 2743 |
| 1627 | 10.0.0.8 | 1246 |
| ⋮ | ⋮ | ⋮ |

CONNECTIONS OF NODES ON DIFFERENT NETWORKS

BACKGROUND OF THE INVENTION

This invention relates to improving connections between nodes on different networks.

The use of small networks such as those found in small office/home office (SOHO) and residential settings is growing rapidly. Such private networks are typically connected to a larger public network (such as the Internet) through a gateway with a single internet protocol (IP) address that is valid on the public network. Nodes on the private network typically do not have IP addresses that are valid on the public network.

In order for nodes on the public network to transmit packets to nodes on the private network, the packets must be addressed to the public IP address of the gateway, which must then determine which node on the private network is the intended recipient. One common approach to this problem is Network Address Port Translation (NAPT). In a NAPT gateway, particular public network sockets of the gateway are mapped to particular sockets on nodes of the private network. Thus, when a packet from the public network is received on a particular socket at the network gateway, it is automatically forwarded to the socket on the private network to which the public network socket is mapped.

A scheme for NAPT is described in P. Srisuresh and K. Egevang, "Traditional IP Network Address Translator" published by the Internet Engineering Task Force in September, 1999, and available at http://www.ietf.cnri.reston.va.us/internet-drafts/draft-ietf-nat-traditional-03.txt. The NAPT scheme enables public network sockets to be dynamically mapped to private network sockets when a network connection is initiated from a private network socket. However, under the NAPT scheme connection requests originating from public network nodes can be processed by the gateway only if one of the gateway's public network sockets has been previously mapped to a socket on one of the private network nodes. This mapping must be done manually by a user at the gateway.

Other methods for establishing connectivity between public network sockets and private network sockets are described in M. Leech, et al., "RFC1928: SOCKS Protocol Version 5" published by the Internet Engineering Task Force in March, 1996 and available at http://www.ietf.cnri.reston.va.us/rfc/rfc1928.txt (describing the SOCKS protocol), and in M. Borella & D. Grabelsky, "Realm Specific IP: Protocol Specification" published by the Internet Engineering Task Force in August, 1999 and available at http://www.ietf.cnri.reston.va.us/internet-drafts/draft-ietf-nat-rsip-protocol-02.txt (describing the RSIP protocol). In both of these methods, connection requests received from the public network by the gateway are processed based on a previous mapping of the socket on which the request was received to a particular private network socket. In both SOCKS and RSIP, socket mapping is done in response to specific requests received by the gateway from particular private network nodes, on a first-come-first-serve basis.

For the purposes of this application, a "port" refers to a logical network connection point having a unique identifier with respect to a particular network node. For example, in the internet protocol, each network node may engage in multiple simultaneous connections on distinct numbered ports, e.g. port 25. A "socket" refers to a particular port on a particular node, and is referred to by the concatenation of a network address and a port identifier.

SUMMARY

In general, in one aspect, a method for establishing a connection between a node on a first network and at least one node on a second network lacking a valid address on the first network includes receiving at a gateway a connection request from the node on the first network, sending information related to the connection request to a plurality of nodes on the second network, receiving responses to the sent information from at least one of the nodes on the second network, and establishing at least one connection between at least one node on the second network from which responses are received, and the node on the first network, according to the order of the received responses or according to priority weighting information about the nodes from which responses are received.

Embodiments of the invention may have one or more of the following advantages. Public network nodes may establish connections with private network nodes lacking public network addresses without the need to bind private network sockets to public network sockets in advance of making the connection. Users on public network nodes may establish connections with at least one user on a private network node lacking a public network address without needing to know the particular private network node on which the user is located.

DETAILED DESCRIPTION

Figure 1:
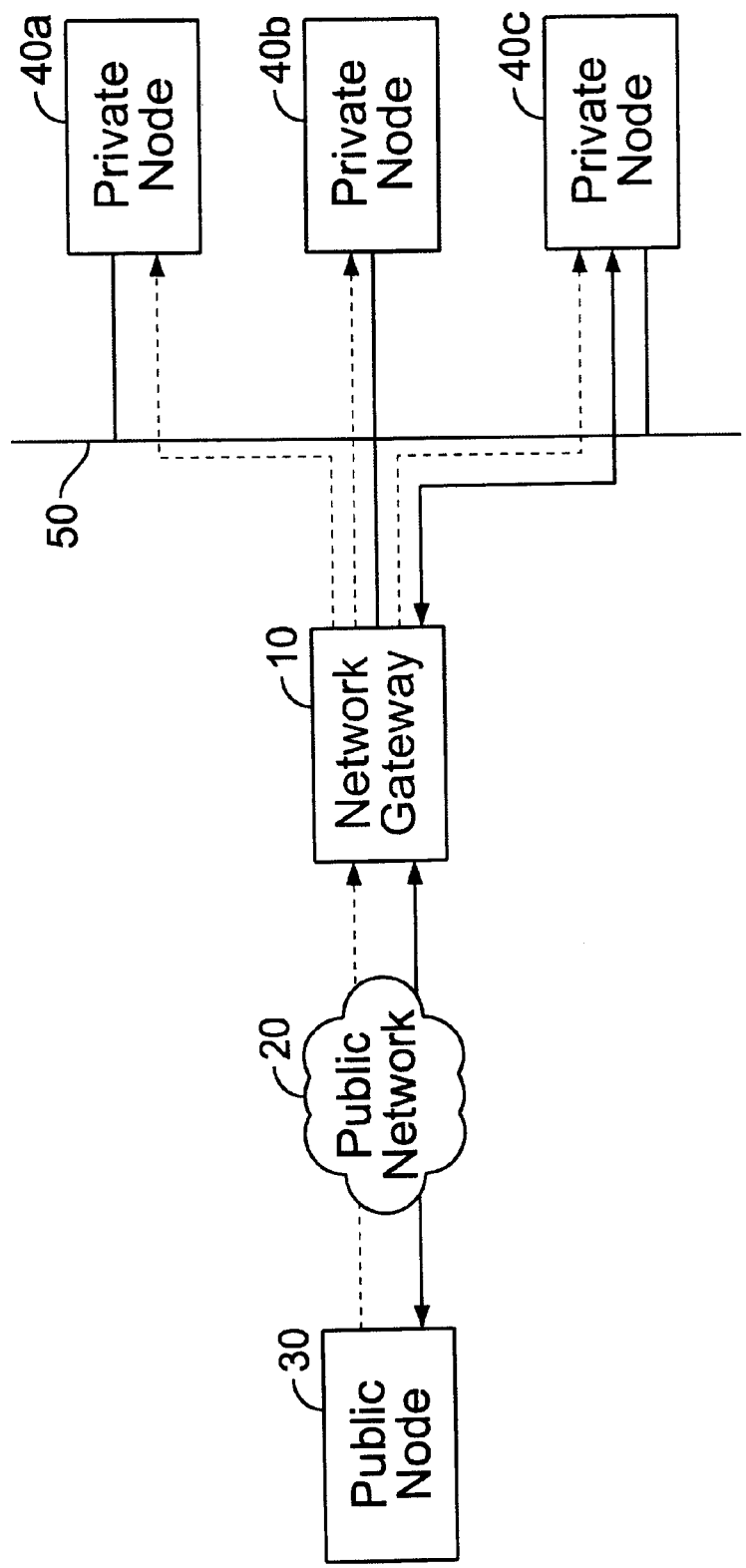
FIG. 1 shows a gateway connecting a private network to a public network.

Shown in FIG. 1 is a simplified diagram of a small private network 50 gatewayed to a public network 20. A network gateway 10 is connected both to the public network 20 and to the private network 50. Through the public network 20, the network gateway 10 is able to communicate with public network nodes 30, such as personal computers, web servers, and the like. The network gateway has a at least one public network address, by which it may be addressed by public network nodes. Each public network node also has at least one public network addresses by which it may be addressed by other public network nodes, including the network gateway.

Through the private network 50, the network gateway 10 is able to communicate with private network nodes 40a, 40b, and 40c, which may also be personal computers, web servers, and the like. This communication is done using private network addresses that are not valid on the public network 20. For example, communication between the gateway and the private network nodes may be done using IP addresses that are unique only within the private network.

Figures 2, 3:
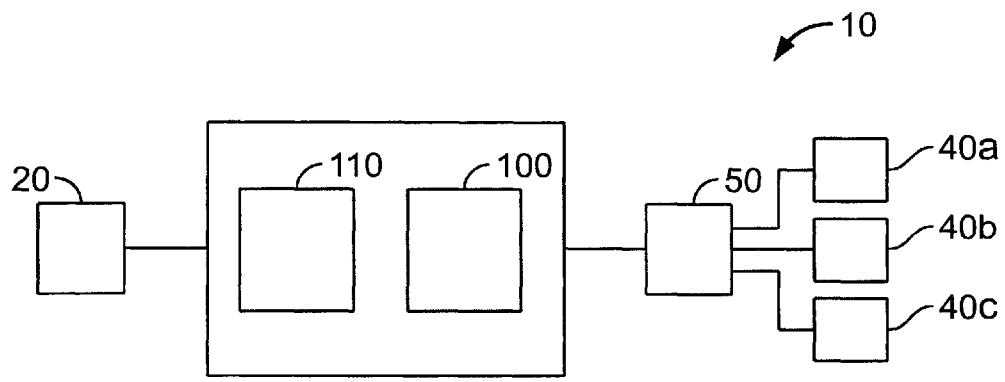
FIG. 2 shows in more detail a gateway connecting a private network to a public network.
FIG. 3 shows an example of a socket map.

FIG. 2 shows network gateway 10 in more detail. Gateway 10 includes a computer processor 110 programmed to permit the gateway to communicate with other nodes on public network 20 and private network 50. Although only one public network and one private network are shown in this embodiment, gateways may be connected to multiple public or private networks. Gateway 10 also includes a socket map 100 which includes a set of mappings of public network sockets of the gateway to sockets on particular nodes on the private network 50. Each entry in socket map 100 includes an identifier for one of the public network sockets on the gateway and an identifier for a socket on one of the private network nodes 40 to which it is mapped.

FIG. 3 shows an example of a socket map 110. As indicated, each entry 125 in the socket map 110 is a triplet which includes a public network port number, a private network address, and a private network port number. If the gateway has more than one public network address, each entry would also include information identifying a public network address. If the gateway is connected to more than one public or private network, each entry would also include information identifying the particular public or private network to which the public or private network address and port number apply.

In the first example entry shown in FIG. 3; the public network port 1095 on the gateway 10 is mapped to port 1095 on the private network node having address 10.0.0.3. The second entry indicates that the public network port 2743 on the gateway 10 is mapped to port 2743 on the private network node having address 10.0.0.4. The third entry indicates that the public network port 1627 on the gateway 10 is mapped to port 1246 on the private network node having address 10.0.0.8.

Figure 4:
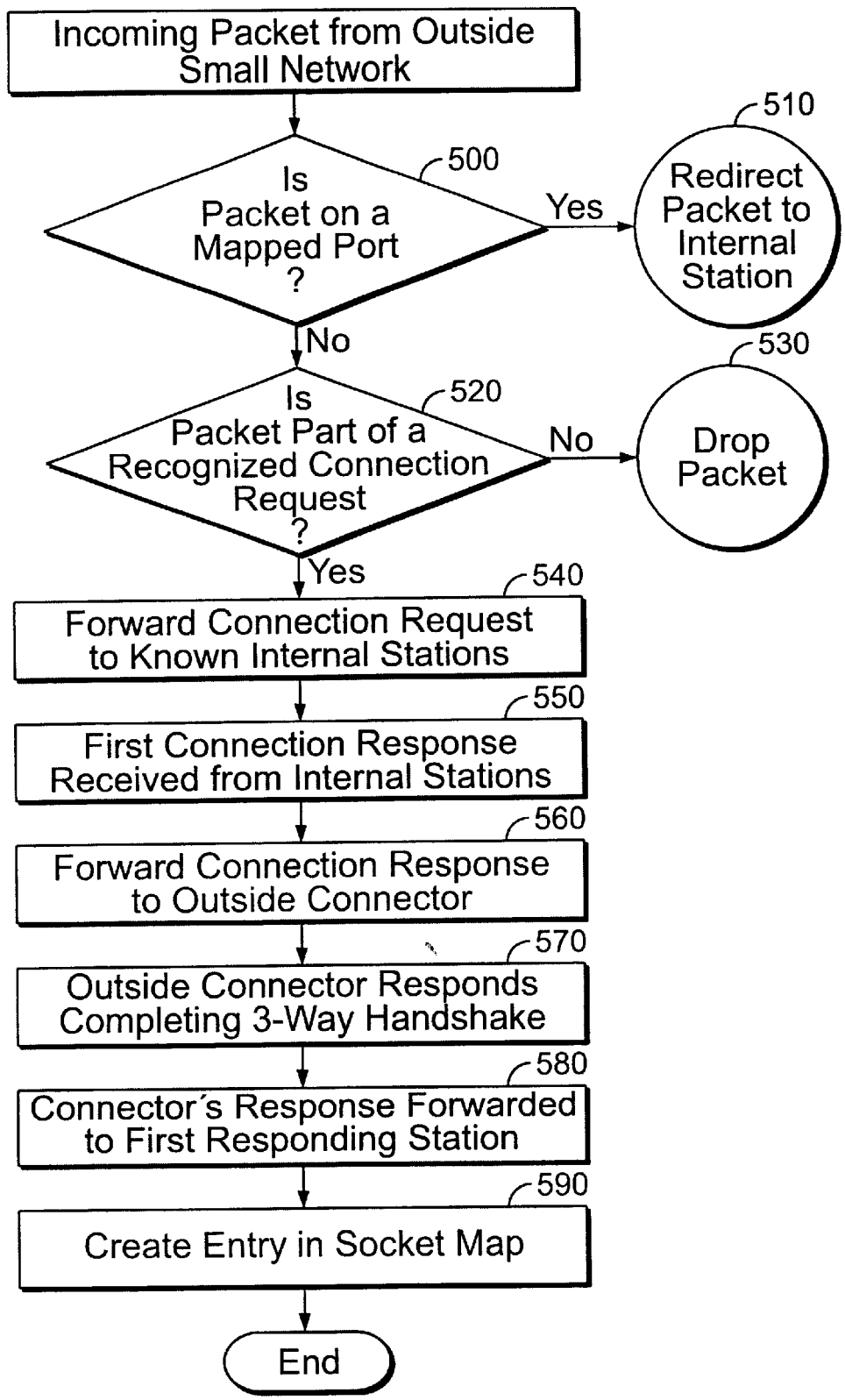
FIG. 4 shows steps taken by a gateway to process a connection request.

Referring now to FIG. 4, network gateway 10 processes incoming network packets as follows. When a network packet is received on one of the public network sockets of the gateway 10, the gateway 10 checks the socket map 100 to determine whether the socket on which the packet was received is currently mapped to a particular private network node socket (step 500). If it is, the gateway redirects that packet to the indicated private network socket, and no further processing is performed (step 510).

If the public network socket on which the packet was received is not currently mapped to a private network socket, the packet is examined to determine whether it contains a connection request recognized by the server (step 520). In certain embodiments, the server recognizes low-level (e.g. transport layer) connection requests, such as the Transmission Control Protocol (TCP) SYN request. In other embodiments, the server will recognize higher level application layer requests (e.g. a request to connect with a particular user running an internet telephone application). If the packet does not contain such a request, the packet is dropped and no further processing occurs (step 530).

If the packet does contain a recognized connection request, the server forwards the packet to the sockets on all of the nodes on the private network corresponding to the socket on which the packet was received on the public network (i.e., the socket on each node having the same port number as the public network socket on which the packet was originally received) (step 540). In an alternative embodiment, the server forwards the packet only to a fixed subset of the nodes on the private network. In another alternative embodiment, the server forwards the packet to a subset of nodes on the private network determined by the content of the packet.

The factors which determine whether or not a particular private network node responds to a particular connection request are application specific. For example, connection requests received on certain ports may be identified with particular applications which may be running on some, but not all, of the private network nodes. Only those nodes on which the application is running will respond to requests on those ports. Alternatively, the connection request may contain information identifying a particular user with whom a connection is desired, and a particular node will only respond if the identified user is present at that node.

After forwarding the packet, the server waits until a response packet is received from one of the private network nodes (step 550). A response packet is one containing information (coded according to a protocol in the same layer as the connection request) indicating that the responding node is willing to establish the connection requested by the connection request. A private network node may generate a response packet automatically (e.g. if the connection request is one of a set of request types to which it is programmed to respond). Alternatively, the private network node may generate a response packet through a user mediated process. That is, the user at a private network node may be presented with the request (e.g. an online "chat" request) and indicate to the private network node whether or not to accept the request.

If no response is received within a timeout period, no further processing is done. If a response is received from a socket on one of the private network nodes, that response is modified to appear as if it had originated at the gateway (by changing the "source" address to the gateway's public IP network socket on which the request packet was originally received) and then forwarded to the public network socket from which the connection request was received (step 560). Any subsequent responses received from different private network sockets are ignored.

After forwarding the response packet to the public network socket, the gateway waits to receive back from that socket a confirmation packet, which confirms that a connection has been established (step 570). If such a packet is not received within a timeout period, no further processing is done. If such a packet is received (step 580), it is forwarded to the private network socket from which the response packet was received, and an entry is established in the socket map mapping the gateway's public network socket on which the original request packet was received to the private network socket from which the response packet was received (step 590) Thus, a connection is established between the public and private network nodes, and the process ends, as indicated by the reference sign "END" in FIG. 4.

The connection process is illustrated schematically in FIG. 1. The dashed lines indicate the path followed by a packet containing a connection request. It originates at public network node 30 and is sent to network gateway 10 via public network 20. From network gateway 10, it is sent to private nodes 40 via private network 50. The solid lines show the connection that results if private node 40c responds first to the connection request. Private node 40c is connected to public node 30, via private network 50, gateway 10 and public network 20.

After a connection between a public network socket and a private network socket has been established, it may be necessary for the connection to be moved to another port on the private network node. For example, some application protocols require that an initial connection be made on a well-known port associated with the protocol (e.g. port 25 for SMTP), and then switched to another port for bulk data transfer. This is typically accomplished by having the node that accepted the connection transmit to the node that requested the connection a new socket identifier for continuing the connection, close the original connection, and then listen on the newly identified socket for a new connection request. Alternatively the accepting node may initiate a new connection back to the connecting node.

Accordingly, the gateway 10 supports a protocol by which a node on the private network 50 may request to have some of its sockets be bound to particular public network sockets on the gateway. Existing protocols for binding the gateway's public network sockets to private network node sockets, such as SOCKS or RSIP, may be used for this purpose.

When a private network node 40 makes such a bind request, the gateway 10 responds by creating an entry in the socket map 100 binding a socket of the private network node to one of the gateway's public network sockets, and then transmitting a packet to the requesting node indicating that socket has been bound.

In this way, public network nodes are able to establish connections with private network nodes lacking unique public network addresses in a flexible manner that does not require public network sockets to be mapped to private network sockets prior to the establishment of such connections.

Although in some embodiments incoming requests to establish network connections are forwarded to private network nodes 40 to determine which of them are prepared to respond to the request, this is not required, and any method of polling the private network nodes 40 may be used. For example, the gateway 10 may use an out-of-band technique to poll the private network nodes 40 concerning which of them are prepared to respond to the connection request, and allocate the connection to the first private network node responding affirmatively.

Although in some embodiments the gateway allocates the connection to the first private network node responding affirmatively to a connection request, that is not required.

In an alternative embodiment, when private network nodes receive connection requests, they respond with out-of-band responses indicating a priority weighting. Rather than establishing the connection with the first private network node to respond, the gateway establishes the connection with the responding private network node that has highest priority weighting of those responding within a specified time interval. In another alternative embodiment, the priority weighting information resides in the gateway, and is used by the gateway to determine the responding network node having the highest priority weighting of those responding within the specified time interval.

Although in some embodiments the connection request from the public network node 30 is an in-band request (i.e. one that treats the gateway 10 as it were the node with which the connection will be made, using the protocol which will ultimately be used to establish the connection), this is not necessary. In an alternative embodiment, the public network node 30 makes an out-of-band connection request to the gateway 10 in which it supplies extra information concerning the nature of the connection requested. For example, the extra information may include the identity of a user on the public network node 30, or the identity of a user on a private network node 40 with which the public network node seeks to establish a connection. The extra information may also describe generally the type of node with which a connection is sought (e.g. "video camera at front door").

Alternatively, the public network node may make an out-of-band query of the gateway to determine the types of services or devices that are available, to which the gateway responds with a list of available types. The public network node then makes an out-of-band connection request choosing from one of the available types identified in the response received from the gateway.

Upon receipt of such a request, the gateway forwards this information to the private network nodes, which use the information in determining whether to respond to the request. The gateway then establishes a connection between the first responding private network node 40 and the requesting public network node 30.

In another alternative embodiment, the gateway may establish non-exclusive connections between multiple private network nodes 40 and a given public network node 30 through a particular public network socket on the gateway 10. In this embodiment, after forwarding a connection request received from a public network node 30 to all of the private network nodes 40, the gateway 10 does not ignore the responses received after the first one has arrived. Instead, the gateway creates an entry in the socket map 100 associating all of the private network sockets from which private network nodes 40 responded to the request with the gateway's public network socket on which the original request was received. Subsequently all incoming packets to that public network socket are retransmitted to all of the private network node sockets associated with it in the socket map 100. Preferably, the gateway 10 permits such non-exclusive connections only when the connection request received from the public network node indicates that the connection sought is of a type that permits such non-exclusive connections (e.g. a connection for an audio conference call), and when the gateway has application-specific capabilities for combining data from multiple private network nodes into a single data stream to the public network node (e.g. audio mixing for an audio conference call).

The present invention is defined by the following claims and is not limited to the particular embodiments described herein. Other embodiments are within the scope of the following claims.

What is claimed is:

1. A method for establishing a connection between a node on a first network having a first addressing scheme and at least one node on a second network having a second addressing scheme, comprising:

receiving at a gateway a connection request message from the node on the first network, the message being routed to the gateway based on the first addressing scheme;

sending information related to the connection request message to a plurality of nodes on the second network;

receiving responses to the sent information from a plurality of nodes on the second network; and establishing at least one connection between at least one of the nodes on the second network from which responses are received, and the node on the first network, according to the order of the received responses or according to priority weighting information concerning the nodes from which the responses are received.

2. The method of claim 1, wherein the connection is established according to the order of the received responses.

3. The method of claim 1, wherein the connection is established according to priority weighting information.

4. The method of claim 3, wherein establishing a connection comprises establishing a connection between at least one of the nodes on the second network from which responses are received, and the node on the first network, according to priority weighting information received in the responses.

5. The method of claim 1, wherein establishing a connection comprises establishing a connection between the node on the first network and only one node on the second network from which a response is received.

6. The method of claim 5, wherein establishing a connection comprises establishing a connection between the node on the first network and the node on the second network from which the earliest response is received by the gateway.

7. The method of claim 5, wherein establishing a connection comprises establishing a connection between the node on the first network and the node on the second network having the greatest priority weighting among those nodes from which a response is received within a specified amount of time.

8. The method of claim 1, wherein the first network comprises a public network and the second network is a private network.

9. The method of claim 1, wherein sending information related to the connection request comprises retransmitting the connection request.

10. The method of claim 1, further comprising receiving at the gateway a request to bind a socket from one of the nodes on the second network;

creating an association between a first socket, located on the node from which the request was received and a second socket on the gateway; and forwarding messages received on the second socket to the first socket.

11. The method of claim 1, wherein the connection request comprises a Transmission Control Protocol connection request.

12. The method of claim 1, wherein the connection request comprises user identifying information.

13. The method of claim 1, wherein the connection request comprises an out-of-band request.

14. The method of claim 1, wherein sending information related to the connection request comprises sending an out-of-band message to the plurality of nodes on the second network.

15. The method of claim 8, wherein the public network comprises the Internet.

16. The method of claim 1, wherein the connection request is made using an application layer protocol.

17. The method of claim 10, wherein the request to bind a socket is received at the gateway from a particular node on the second network after an association has been created between the particular node and the node on the first network according to the response from the particular node to the information sent by the gateway.

18. The method of claim 1, wherein the connection request is received by the gateway on a socket associated with a particular port number, and wherein sending information related to the connection request to a plurality of nodes on the second network comprises retransmitting the connection request to sockets on each of the plurality of nodes associated with the particular port number.

19. The method of claim 1, wherein the plurality of nodes on the second network is a subset of the nodes on the second network and further comprising selecting the subset according to information contained in the connection request.

20. The method of claim 1, wherein the plurality of nodes on the second network is a subset of the nodes on the second network and further comprising selecting the subset according to the characteristics of the nodes.

21. A computer program residing on a computer readable medium comprising instructions for causing a computer to:

receive at a gateway a connection request message from a node on a first network having a first addressing scheme, the message being routed to the gateway based on said first addressing scheme;

send information related to the connection request message to a plurality of nodes on a second network having a second addressing scheme;

receive responses to the sent information from a plurality of nodes on the second network; and establish at least one connection between at least one of the nodes on the second network from which responses are received, and the node on the first network, according to the order of the received responses or priority weighting information concerning the nodes from which the responses are received.

22. A network gateway comprising:

means for receiving at a gateway a connection request message from a node on a first network having a first addressing scheme, the message being routed to the gateway based on said first addressing scheme;

means for sending information related to the connection request message to a plurality of nodes on a second network having a second addressing scheme;

means for receiving responses to the sent information from a plurality of the nodes on the second network; and means for establishing at least one connection between at least one of the nodes on the second network from which responses are received, and the node on the first network, according to the order of the received responses or according to priority weighting information concerning the nodes from which the responses are received.

23. A gateway comprising:

a network interface to a first network having a first addressing scheme for communicating with nodes on the first network;

a network interface to a second network having a second addressing scheme for communicating with nodes on the second network;

a computer processor programmed to:

receive a connection request message from a node on the first network, said message being routed to said gateway based on the first addressing scheme;

send information about the connection request message to nodes on the second network;

receive responses to the sent information from a plurality of the nodes on the second network; and establish at least one connection between at least one of the nodes on the second network from which responses are received, and the node on the first network, according to the order of the received responses or according to priority weighting information concerning the nodes from which the responses are received.

24. A computer network comprising:

a gateway according to claim 1;

a plurality of network nodes connected to the gateway via a communication medium.

25. A computer program residing on a computer readable medium comprising instructions for causing a computer to:

receive information sent from a gateway related to a connection request message routed to the gateway from a node on a first network having a first addressing scheme, said information having been sent to a plurality of recipients, and said information not defining a single appropriate recipient to respond to the sent information; and send a response to the sent information addressed to the gateway under a second addressing scheme for establishing a connection between a node on a second network and a node on the first network.

* * * * *